UNITED STATES PATENT OFFICE.

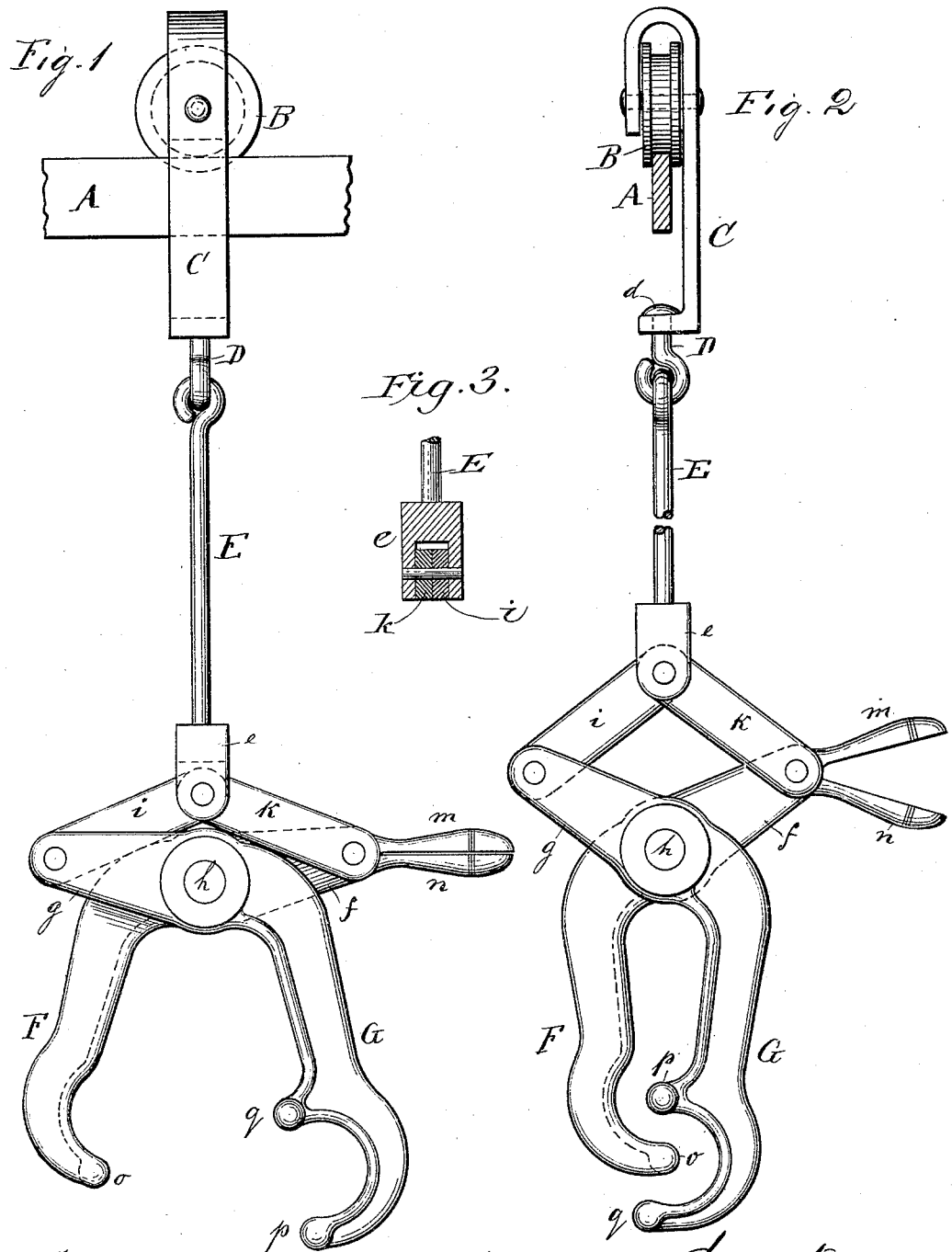

JOHN SCHAUB, OF CHICAGO, ILLINOIS.

AUTOMATIC MEAT-HANGER.

SPECIFICATION forming part of Letters Patent No. 436,382, dated September 16, 1890.

Application filed June 23, 1890. Serial No. 356,346. (No model.)

*To all whom it may concern:*

Be it known that I, JOHN SCHAUB, a citizen of the United States of America, residing at Chicago, in the county of Cook and State of Illinois, have invented certain new and useful Improvements in Automatic Meat-Hangers, of which the following is a specification, reference being had therein to the accompanying drawings.

This my invention relates to devices for hanging meat. This was heretofore done by passing an iron hook through the meat, which, however, spoils the portions surrounding the hook and makes it necessary to cut such portions of meat out.

It is the object of this my invention to provide a device for suspending meat by clamping between the jaws of a grab; and with that object in view my invention consists of the novel devices and combinations of devices hereinafter described and specifically claimed.

In the accompanying drawings, Figures 1 and 2 represent elevations of the device in its open and gripping positions, and Fig. 3 represents a vertical cross-section of the bifurcated head of the suspension-bar.

Corresponding letters of reference in the several figures of the drawings designate like parts.

A denotes the rail rigidly secured or suspended, and B a grooved roller riding thereon and pivoted in a yoke C, having a rectangular-eyed lug $c$ in its lower end, in which is pivotally secured an eye-pin D by its rivet-head $d$. Into this eye-pin D is linked the upper eyed end of a rod E, having to its lower end a bifurcated head $e$.

F and G are two jaws pivotally coupled by a pin $h$, and each provided with an arm $f$ and $g$, that relative to their respective jaws are on obtuse angular positions. Each such arm $f$ and $g$ has an eyed end, and the head $e$ of rod E is also eyed, and two links $i$ and $k$ pivotally connect the eyed ends of arms $f$ and $g$ with the head $e$, whereby the operation of these jaws F and G is like a grip, the jaws closing by their own gravity and exerting a gripping force in direct operation to the weight suspended.

The jaw F has formed on its end a curved prong $o$, that with the jaws closing will enter the semicircle between two prongs $p$ and $q$ on jaw G, thus providing a rigid grip on the meat interposed, and the number of such prongs may be increased to as many as may be desirable.

The arm $f$ of jaw F has an extension $m$, and the link $k$ has an extension $n$, and both these extensions $m$ and $n$ will be on relatively acute angular positions while the jaws are closed, as shown by Fig. 2; but with grasping these extensions $m$ and $n$ and folding them upon each other both combined will form a handle, and with thus compressing these handles $m$ and $n$ the jaws will be swung apart for inserting the meat to be suspended, and then with releasing the handles $m$ $n$ again the jaws will close upon the meat from both sides, taking a firm hold thereof that will increase their gripping force with the increased gravity of the meat suspended.

It will thus be readily seen by this device meat can be suspended very quick and as readily released again without damage to the same.

What I claim is—

1. The combination of jaws F and G, pivotally connected at $h$, one jaw being provided at its end with two or more prongs $p$ and $q$, and the other jaw with one or more prongs $o$, the prongs of opposite jaws being at alternate positions and each jaw being provided with an arm $f$ $g$, hanger-bar E, with eyed head $e$, and links $i$ and $k$, pivotally coupling the arms $f$ and $g$ with head $e$, all substantially as set forth, for the purpose specified.

2. The combination of jaws F and G, pivotally connected at $h$ and each provided with an arm $f$ $g$, hanger-bar E, with eyed head $e$, links $i$ and $k$, pivotally coupling the arms $f$ and $g$ with head $i$, and the handle-extensions $m$ and $n$, forming part, respectively, of arm $f$ and link $k$, all substantially as set forth, for the purpose specified.

3. The combination of jaws F and G, pivotally connected at $h$, and one jaw being provided at its end with two or more prongs $p$ and $q$, and the other jaw with one or more prongs $o$, the prongs of opposite jaws being at alternate positions and each jaw being provided with an arm $f$ $g$, hanger-bar E, with eyed head $e$, links $i$ and $k$, pivotally coupling the arms $f$ and $g$ with head $e$, and handle-extensions $m$ and $n$, forming part, respectively, of arm $f$ and link $k$, all substantially as set forth, for the purpose specified.

In testimony whereof I affix my signature in presence of two witnesses.

JOHN SCHAUB.

Witnesses:
WILLIAM H. LOTZ,
OTTO LUEBKERT.